United States Patent
Wheeler et al.

(10) Patent No.: US 10,657,016 B2
(45) Date of Patent: May 19, 2020

(54) RECOVERING STRANDED DATA

(71) Applicant: Hewlett Packard Enterprise Development LP, Houston, TX (US)

(72) Inventors: Andrew R. Wheeler, Fort Collins, CO (US); Gregg B. Lesartre, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/215,252

(22) Filed: Dec. 10, 2018

(65) Prior Publication Data

US 2019/0114241 A1 Apr. 18, 2019

Related U.S. Application Data

(63) Continuation of application No. 14/888,338, filed as application No. PCT/US2013/052671 on Jul. 30, 2013, now Pat. No. 10,152,399.

(51) Int. Cl.
*G06F 11/20* (2006.01)
*G06F 12/02* (2006.01)

(52) U.S. Cl.
CPC ........ *G06F 11/2097* (2013.01); *G06F 11/203* (2013.01); *G06F 11/2025* (2013.01); *G06F 11/2035* (2013.01); *G06F 12/0246* (2013.01); *G06F 2212/7208* (2013.01)

(58) Field of Classification Search
CPC ............. G06F 11/2023; G06F 11/2028; G06F 11/203; G06F 11/2094; G06F 11/2097
See application file for complete search history.

(56) References Cited

U.S. PATENT DOCUMENTS

| | | |
|---|---|---|
| 6,505,305 B1 | 1/2003 | Olarig |
| 6,658,478 B1 | 12/2003 | Singhal et al. |
| 6,745,310 B2 | 6/2004 | Chow et al. |
| 6,941,396 B1 | 9/2005 | Thorpe |
| 7,293,197 B2 | 11/2007 | Jadon et al. |
| 7,334,062 B1 | 2/2008 | Agarwal et al. |

(Continued)

FOREIGN PATENT DOCUMENTS

CN 101578586 11/2009

OTHER PUBLICATIONS

Godbole, C.U. et al., Performance Evaluation of ISCSI Protocol for Mirroring Application, (Research Paper), 2008.

(Continued)

*Primary Examiner* — Joseph R Kudirka
(74) *Attorney, Agent, or Firm* — Hewlett Packard Enterprise Patent Department

(57) ABSTRACT

A node for a computing system may include a memory module, a main node processor and a management processor. The memory module may include a non-volatile memory, a module memory controller having a main bus interface for connection to a main bus and a management device providing access to the non-volatile memory through a sideband management bus. The main node processor is connected to the module memory controller and has a main bus interface for connection to a main bus. The management processor has a sideband interface for connection to the sideband management bus. The sideband management processor detects a failure of the node and, in response thereto, copies data from the non-volatile memory of the memory module to another node across the sideband management bus.

20 Claims, 5 Drawing Sheets

(56) References Cited

U.S. PATENT DOCUMENTS

| | | |
|---|---|---|
| 7,694,312 B2 | 4/2010 | Rivard |
| 7,797,572 B2 | 9/2010 | Kawashima et al. |
| 7,958,432 B2 | 6/2011 | Ash |
| 8,060,774 B2 | 11/2011 | Smith et al. |
| 8,060,779 B2 | 11/2011 | Beardsley et al. |
| 8,185,776 B1 | 5/2012 | Gentes |
| 8,255,739 B1 | 8/2012 | Chatterjee et al. |
| 8,380,954 B1 | 2/2013 | Patil et al. |
| 8,464,092 B1 | 6/2013 | Gentes et al. |
| 9,396,145 B1 | 7/2016 | Chu et al. |
| 2003/0065861 A1 | 4/2003 | Clark |
| 2004/0059870 A1 | 3/2004 | Ash et al. |
| 2005/0039090 A1 | 2/2005 | Jadon et al. |
| 2005/0097208 A1 | 5/2005 | Chu et al. |
| 2005/0108593 A1 | 5/2005 | Purushothaman et al. |
| 2005/0240809 A1 | 10/2005 | Ash et al. |
| 2006/0015773 A1 | 1/2006 | Singh et al. |
| 2007/0180314 A1 | 8/2007 | Kawashima et al. |
| 2008/0010435 A1 | 1/2008 | Smith |
| 2008/0172572 A1 | 7/2008 | Beardsley |
| 2010/0106904 A1 | 4/2010 | Berke et al. |
| 2010/0192008 A1 | 7/2010 | Beardsley |
| 2011/0045779 A1 | 2/2011 | Ito |
| 2011/0213753 A1 | 9/2011 | Manmohan |
| 2014/0372790 A1 | 12/2014 | Antony |
| 2015/0309893 A1 | 10/2015 | Southern et al. |

OTHER PUBLICATIONS

International Searching Authority, The International Search Report and the Written Opinion, dated May 8, 2014, 12 Pages.

RECOVERING STRANDED DATA

CROSS-REFERENCE TO RELATED APPLICATION

This application is a continuation application claiming priority under 35 USC § 120 from U.S. Pat. No. 10,152,399 filed Oct. 30, 2015 which is a United States National Stage § 371 Application of International Patent Application No. PCT/US2013/052671, filed on Jul. 30, 2013, the contents of each of which are incorporated by reference as if set forth in their entirety herein.

BACKGROUND

In current computing systems, the majority of main memory for a computer system is comprised of dual in line memory modules (DIMMs) based on dynamic random access memory (DRAM). DRAM provides very fast access times, is byte addressable, and has attractive price/per bit metrics compared to other memory technologies. However, DRAM is volatile, losing data once power is removed from the device. Thus, the bulk storage for a computer system often includes a hard disk drive, solid state flash memory drives, or a hybrid combination to permanently store data. New generations of memory modules are starting to become available within the computer industry that enable long term storage of data in DIMMs even after power is removed.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
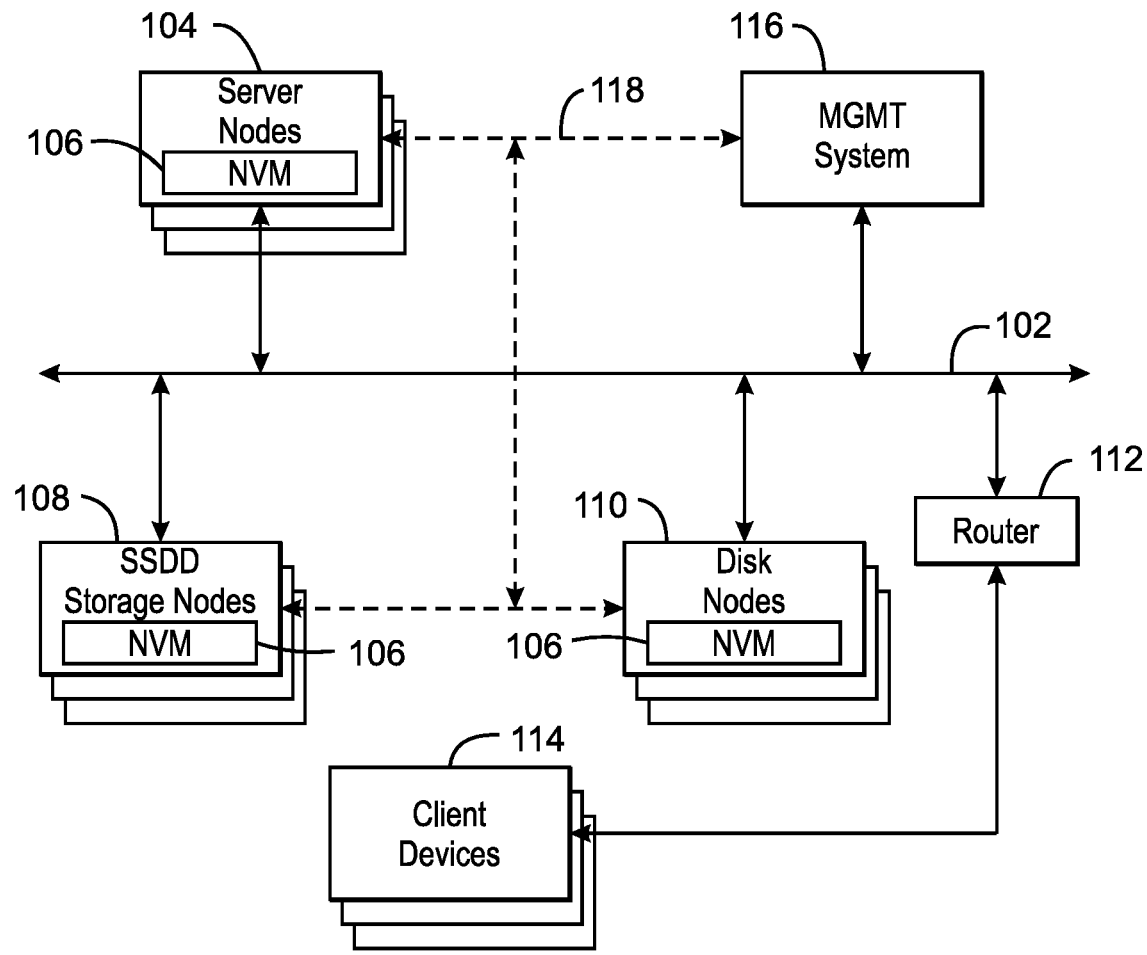
FIG. 1 is a block diagram of an example of a computing system 100 that allows access to stranded data in non-volatile memory (NVM) of a failed node.

Networked computing systems generally include host computing devices, or nodes, configured to provide resources such as storage, applications, databases, and the like. The host computing device may be a server such as a database server, file server, mail server, print server, web server, or some other type of server configured to provide services to client devices within a network.

Although new types of memory modules allow persistent data storage after power is removed from a node, a failure of a given server or node (the "home" node), can result in the persistent data no longer being accessible by other consumers of the data. As used herein, this data has become "stranded" and remains "captive" in the memory module. Techniques described herein relate generally to accessing data that is stranded in the non-volatile memory (NVM) of a computing system, such as the failed node. In one example, a sideband interface connected to the DIMM controller on the memory module allows data to be read (extracted) and written (loaded) through a management subsystem. For example, the standard Serial Presence Detect (SPD) interface on an industry standard DIMM module may be used. During the operation of this technique, the management subsystem and portions of the memory modules operate off stand-by power. This way, data can be extracted when the failed node's main power is off, for example, due to a node failure.

Any number of computing devices may be nodes in the system, such as workstations, servers, network attached storage, and the like. One example of a node that can be used in a computing system is a blade server, which is a server computer having a modular design optimized to minimize the use of physical space. Whereas a standard rack mount server can function with a power cord and network cable, a blade server has many components removed for the purpose of saving space, minimizing power consumption and other considerations, while still having all the functional components to be considered a computer. A multi-slot chassis can hold multiple blade server cartridges and provide shared resources such as power, cooling, networking, various interconnects, and management.

Each node typically includes memory, such as dual in-line memory modules (DIMMs), single in-line memory modules (SIMMs), and the like. As used herein, any reference to a DIMM includes a memory module having any package type. Emerging memory modules that may be used in the DIMMs in nodes may include DRAM, NVM, or combinations of both. NVM can include any number of memory technologies, such as flash memory, phase change memory, spin transfer torque ram, and resistive ram. An NVM memory module could also take the form of a DRAM module having a battery backup.

The use of persistent storage directly in the CPU's directly addressable main memory address space allows many novel system architectures and programming models to be enabled, such as fast power down and restart modes, or more local storage of data. Further, shared storage systems using NVM can enable high availability of the data in the case of a component failure, for example, by storing multiple copies of the data, or by using techniques such as RAID that can reconstitute the data in case of a component failure (such as a processor).

The ability to access data that is stranded as a result of a node failure, such as a CPU or power loss, guards against node failures, but not against DIMM failures. However, the techniques discussed herein are compatible with a system that RAIDs data across multiple DIMMs on the server. This solution can then separately migrate each of the RAID stripes to allow continued operation. If just a DIMM fails, the server can rebuild. If both the server and a DIMM fails, the failover server could rebuild after migration.

FIG. 1 is a block diagram of an example of a computing system 100 that allows access to stranded data in non-volatile memory (NVM) of a failed node. The computing system 100 can have a main bus 102, based on any number of technologies, such as PCI, Infiniband, PCI-Express, HyperTransport®, NuBus, etc., Ethernet, and the like. In some examples, the main bus 102 could also take the form of a switched fabric. The main bus 102 can connect any number of units, including one or more server nodes 104 that may have DIMM, or other structures, that include NVM 106. Long term storage may be provide by one or more solid state disk drive (SSDD) storage nodes 108, which may also include NVM 106. Long term storage may also be provided by one or more disk nodes 110, which may include hard drives, NVM 106, or combinations thereof.

The computing system 100 can have a router 112 to provide access to one or more client devices 114. The client devices can include networks, such as LANs, WANs, or the Internet, or user devices that can access the computing system 100.

A management system 116 can be coupled to the other units in the computing system 100, such as the server nodes 104, the SSDD storage nodes 108, and the Disk nodes 110 through a management, or sideband, bus 118. The management system 116, or devices in the individual units 104, 108, and 110, can detect failures of a unit that may strand data in a home node. The management system 116 can then read the stranded data out from NVM 106 in the home node, for example, over the management bus 118, and write the data to a target node. The data may be written to NVM 106 in the target node, in which a DIMM in the failed node is directly copied to a DIMM in the target node. In other examples, the data may be written to a virtual memory. Any rebuilding of data, for example, recreating data from RAID striped memory may be carried out during the data transfer. Once the data is in the target node, the processes that were operational in the home node before failure can be restarted.

The block diagram of FIG. 1 is not intended to indicate that the computing system 100 is to include all of the components shown in FIG. 1. Further, the computing system 100 may include any number of additional components not shown in FIG. 1, depending on the details of the specific implementation.

Figure 2:
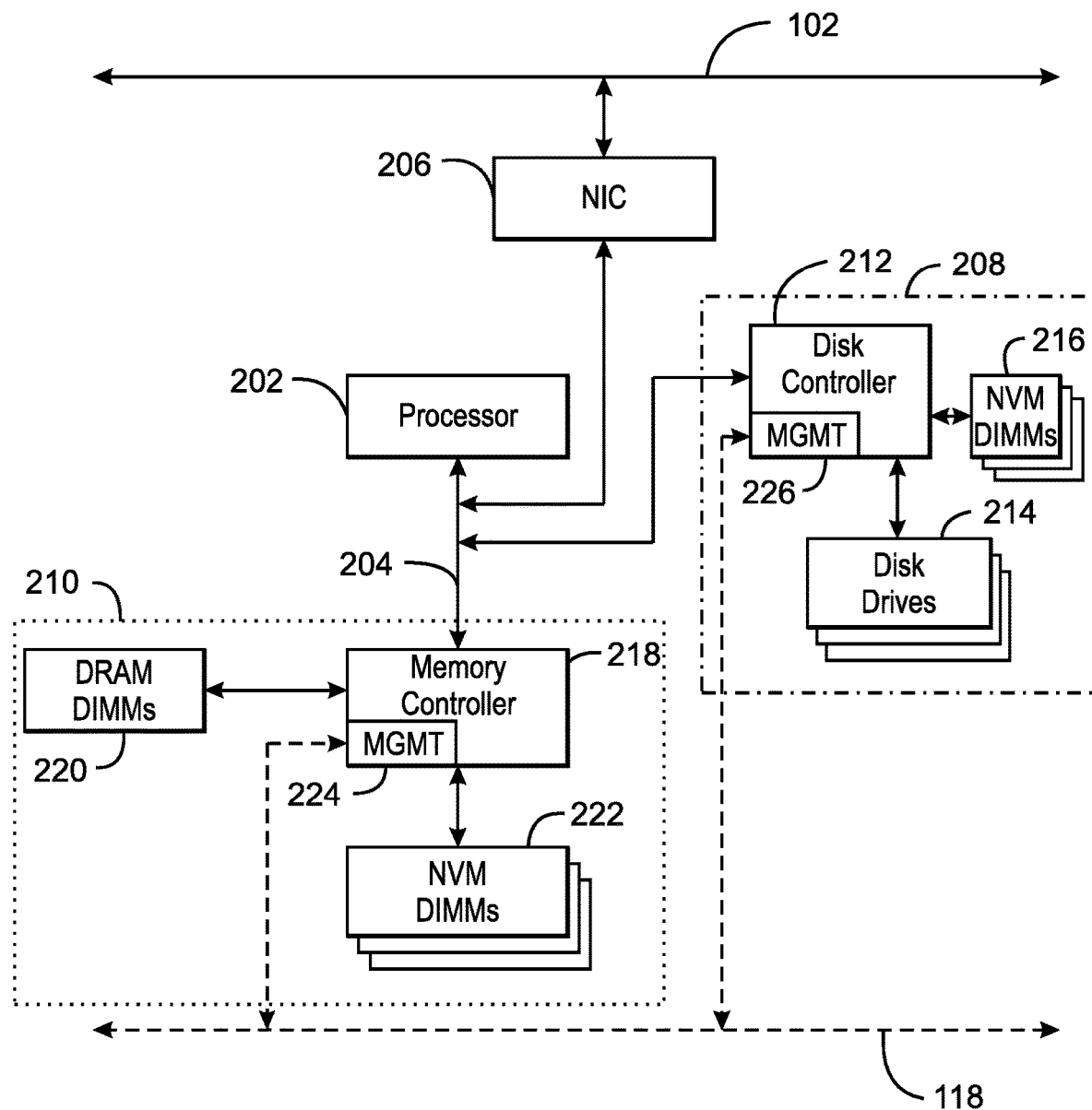
FIG. 2 is a block diagram of an example of a single node that may be used in the computing system of FIG. 1.

FIG. 2 is a block diagram of an example of a single node 200 that may be used in the computing system 100 of FIG. 1. Like numbered items are as described with respect to FIG. 1. The node 200 includes a processor 202 to control operations and perform tasks, such as computation and data access for clients. The processor 202 can be a single core processor, a multi-core processor, a computing cluster, or any number of other configurations. The processor 202 can be implemented as a complex instruction set computer (CISC) or a reduced instruction set computer (RISC) processors, x86 Instruction set compatible processors, multi-core, or any other microprocessor or central processing unit (CPU).

The processor 202 can be coupled to an internal bus 204 within the node 200 for communications with other units. The internal bus 204 can include any number of different types, such as PCI, ISA, PCI-Express, HyperTransport®, NuBus, and the like. Further, the internal bus 204 may be the same type as the system bus 102, or may be a different type. A network interface device 206 may be used to couple the internal bus 204 to the system bus 102. The network interface device 206 can include an Ethernet interface, or any number of other types of other interfaces or switches configured to isolate the internal bus 204 from the system bus 102, while allowing communications.

A number of different units can be included in the node 200 to provide storage for data or programs. The storage units can include a disk subsystem 208, a memory subsystem 210, and the like. The disk subsystem 208 can include a disk controller 212 that controls the reading and writing of data to any combinations of disk drives 214 and memory, such as NVM DIMMs 216.

The memory subsystem 210 can include both non-volatile and volatile random access memory, such as SRAM, DRAM, zero capacitor RAM, SONOS, eDRAM, EDO RAM, DDR RAM, RRAM, PRAM, etc. Further the memory subsystem 210 can include read only memory, such as Mask ROM, PROM, EPROM, EEPROM, and the like. The memory subsystem 210 can include a memory controller 218 that controls access to memory, such as DRAM DIMMs 220 and NVM DIMMs 222.

As described above, a failure of the node 200 may trap data in the NVM DIMMs 222 in the memory subsystem 210 or the NVM DIMMs 216 in the disk subsystem 208. In examples described herein, the data can be accessed and transferred to a different node through the sideband bus 118. To facilitate the transfer, the memory controller 218 may have a management device 224 capable of accessing the NVM DIMMs 222. In the event of a total power failure in the node 200, the management device 224 can provide sufficient power to the memory controller 218 and the NVM DIMMs 222 to access the data. Similarly, the disk controller 212 can have a management device 226 capable of providing similar functions, allowing access to the data in the NVM DIMMs 216 in the disk subsystem 208.

The block diagram of FIG. 2 is not intended to indicate that the node 200 is to include all of the components shown in FIG. 1. For example, a server node may not have the disk subsystem 208. Further, the node 200 may include any number of additional components not shown in FIG. 1, depending on the details of the specific implementation. For example, the node 200 may include man-machine interfaces, such as a display interface, a keyboard interface, a pointing device interface, and the like.

Figure 3:
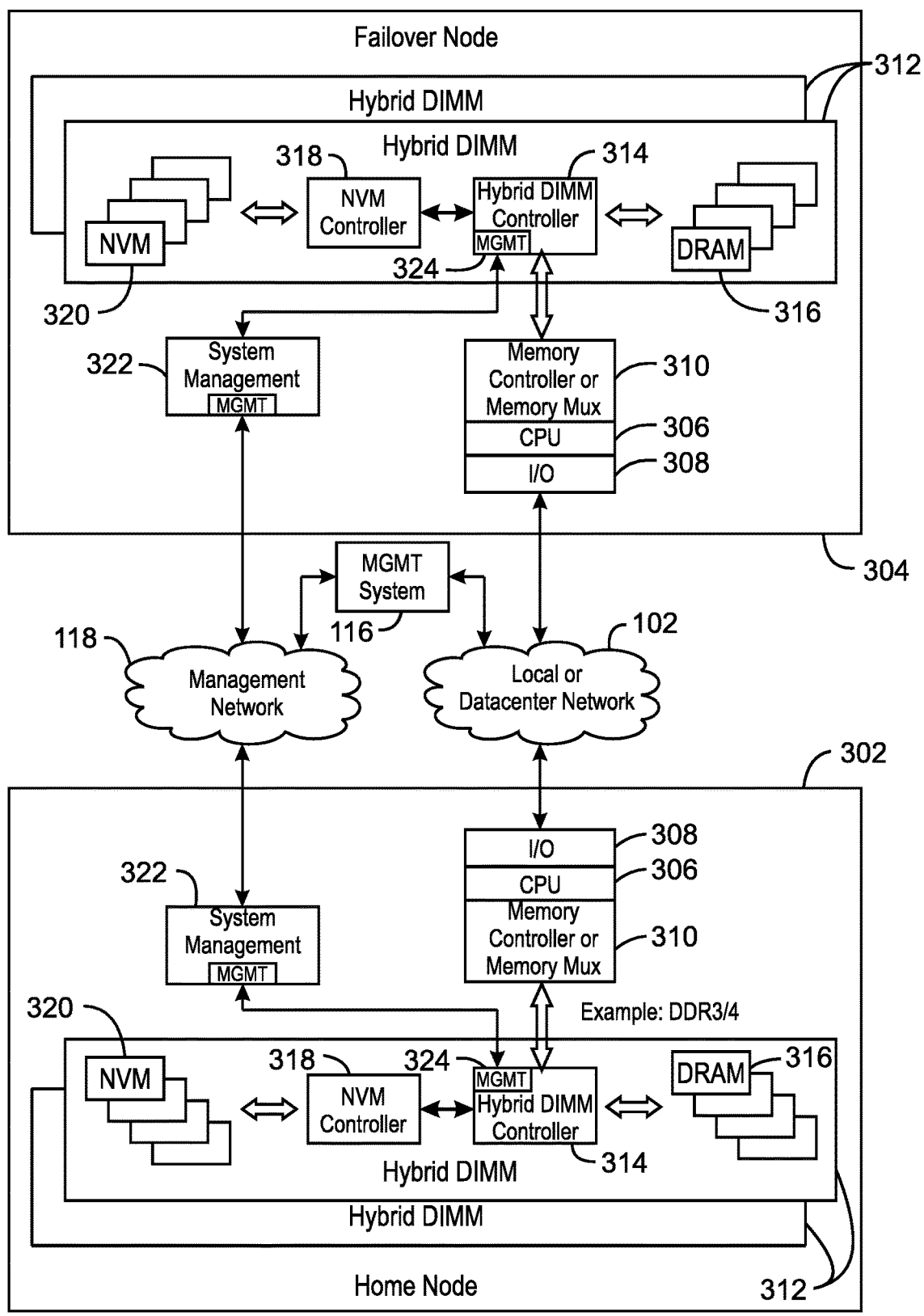
FIG. 3 is a schematic of a computing system showing a home node and a fail-over node.

FIG. 3 is a schematic of a computing system 300 showing a home node 302 and a fail-over node 304. Like numbered items are as described with respect to FIG. 1. In this example, each of the nodes 302 and 304, have a processor 306, which can be any number of types, as described with respect to the processor 202 in FIG. 2. Each processor 306 is coupled to an I/O device 308, for example, to an internal bus. The I/O device 308 provides an interface between each node 302 and 304, and the system bus 102, which may be a local or datacenter network. Each processor 306 is also coupled to a memory controller 310, which is used, in this example, to control one or more hybrid DIMMs 312. Each hybrid DIMM 312 can include a hybrid DIMM controller 314, which can be used to read and write data to DRAM 316. Each hybrid DIMM 312 can also include an NVM controller 318 that is used to control NVM 320 on the hybrid DIMM 312. Each of the nodes 302 and 304 also includes a system management device 322 that can be used to interface with a management network 118. Further, each of the hybrid DIMMs 312 includes a management device 324 that interfaces with the system management device 322, allowing access to persistent data through the management network 118.

During normal operation, the loads and stores to the persistent memory, such as NVM 320, come via the memory controller 310 attached to the processor 306. Other nodes may access this data via the system bus (datacenter network) 102. If the home node 302 fails in any way, the directly attached hybrid DIMMs 312 would no longer be available via the datacenter network 102. Unless this data was somehow replicated in another manner, the data is stranded and vital information could be lost without physically removing the hybrid DIMMs 312.

As described in examples herein, if the home node 302 fails, a management processor, for example, located in the system management device 322, in the management system 116, or in other system devices, notes the failure and begins the process of "reintegration". Through the use of the management network 118, system management processors read the contents from the home node 302 and write the contents to the failover node 304. Once the data has been successfully copied, existing methods can be used to restart processes and applications running from the point of failure. Such methods may include reference workload migration, active/passive high availability, or check-pointing schemes, among others. It can be noted that the failover node 304 does not need to be specified before the failure event. The management system 116 can assign an appropriate target as the failover node 304 after a failure on the home node 302 just prior to instigating the data copy operation.

The schematic of FIG. 3 is not intended to indicate that all of the components must be present or that other components may not be present. For example, the management devices 324 in the hybrid DIMMs 312 may be directly interfaced to the management network 118, eliminating the system management device 322 from the nodes 302 and 304. Further, the node 200 may include disk drive, SSDs, or any number of additional components, depending on the details of the specific implementation.

Figure 4:
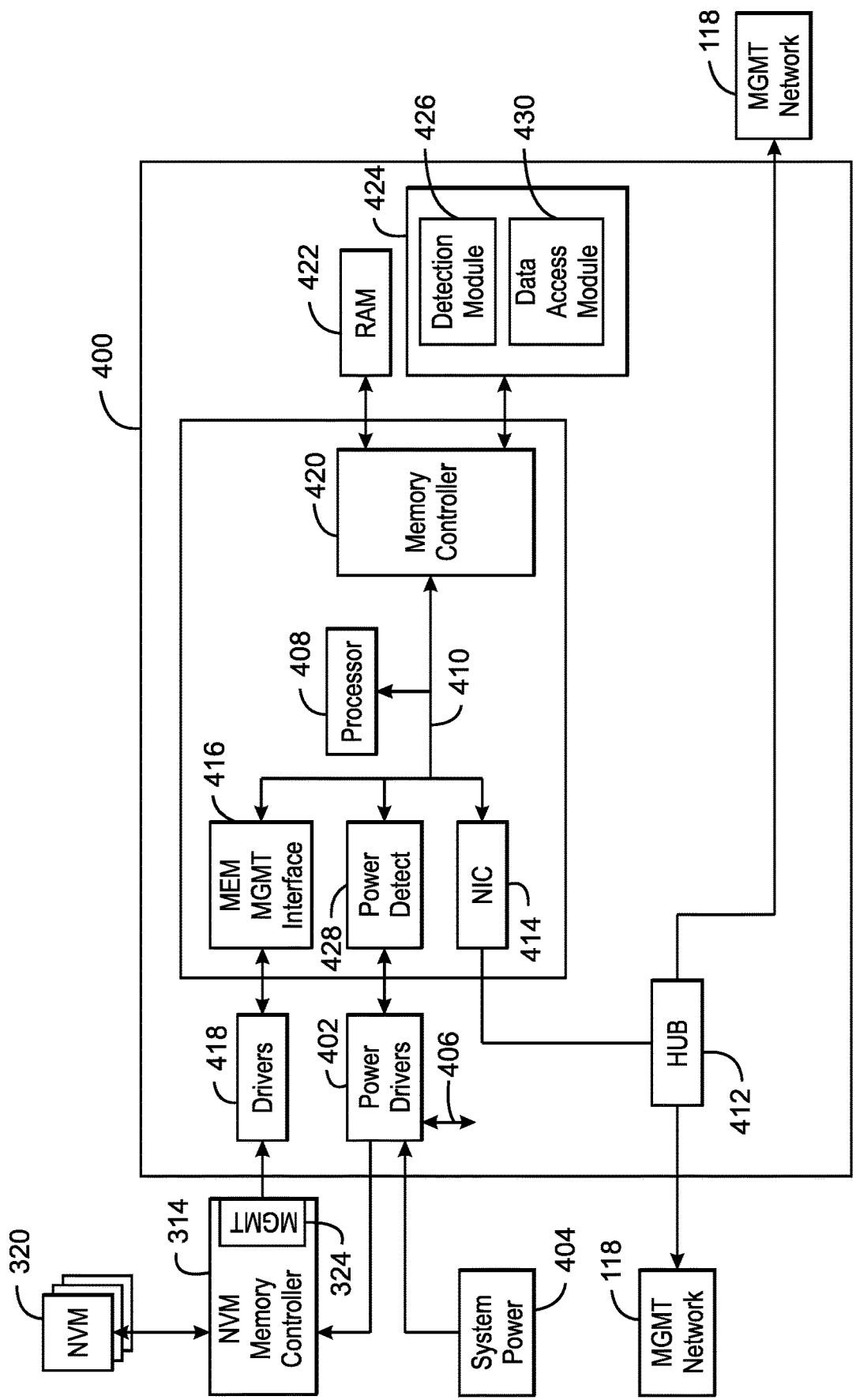
FIG. 4 is a block diagram of a management device that can be used in a node to access data in NVM over a management or sideband bus.

FIG. 4 is a block diagram of a management device 400 that can be used in a node to access data in NVM 320 over a management or sideband bus 118. Like numbered items are as discussed with respect to FIGS. 1 and 3. The management device 400 may be an application specific integrated circuit (ASIC) mounted on a hybrid DIMM, a set of components mounted on a system mother board, a separate module within a node, or any number of other configurations.

As described herein, the management device 400 is adapted to provide access to stranded data in NVM in a failed node, in addition to other functions that may be present. The management device 400 includes a power driver 402, which is coupled to system power 404 and is adapted to provide power to the other functional blocks, for example, through a system power line 406. The management device 400 may be adapted to receive power from the main power of the node, from an emergency or standby power source, or from the system power for the network.

The management device 400 includes a processor 408, which is adapted to control the overall operation of the management device 400. The processor 408 is adapted to communicate with other nodes and a management system over the management network 118. The processor 408 is connected to various other functional blocks of the management device 400 via an internal bus 410. The protocol employed by the internal bus 410 may vary depending on system design considerations. The processor 408 may provide a full transmission control protocol/Internet protocol (TCP/IP) stack, as well as support for dynamic host configuration protocol (DHCP), secure sockets layer (SSL), transport layer security (TLS), and/or proprietary management device protocols.

A system management hub 412 can be connected to the management network 118 to allow the management device 400 to receive communications from a management system or other management devices. The system management hub 412 may be configured to allow a pass through of the management network 118 to other devices. The communications may include stranded data read from a NVM by the management device 400, and sent over the management network 118 to a management device in a fail-over node or to a management system for redirection to a fail-over node. The system management hub 412 is connected to a network interface (NIC) 414 which is coupled to the processor 408 over the internal bus 410. A memory management interface 416 is coupled to the processor 408 over the internal bus 410. The memory management interface 416 can couple to drivers 418, which can be used to interface with a NVM memory controller 314 to read data from, or write data to, a NVM 320.

The management device 400 may include a memory controller 420, which is connected to other system components via the internal bus 410. The memory controller 420 is adapted to manage data flow between the processor 408 and memory resources of the management device 400. In the example shown in FIG. 4, the memory controller 420 manages a random access memory (RAM) 422 and a non-volatile memory 424. The non-volatile memory 424 may be used to store machine-readable instructions for the operation of the management device 400. The instructions may include a detection module 426 used to direct the processor 408 to detect the failure of the node, for example, by detecting the loss of main system power using a power detect interface 428 coupled to the power drivers 402. The non-volatile memory 424 may also include a data access module 430 used to direct the processor 408 to read stranded data from the NVM 320 and transfer it to another unit over the management network 118. The data access module 430 may also include instructions that direct the processor 408 to accept data sent over the management network 118 and write the data to the NVM 320, for example, if the management device 400 was located in a fail-over node. In case of a total loss of node power, including standby power, in one example, the management device may be configured to feed power from the power drivers 402 to the NVM memory controller 314 and the NVM 320 to allow data to be read from the NVM 320.

The block diagram of FIG. 4 is not intended to indicate that the management device 400 includes all of the components shown in FIG. 4. For example, a management device may not include the drivers 418, but may be directly coupled to the NVM memory controller 314. Further, the management device 400 may include any number of additional components not shown in FIG. 4, depending on the details of the specific implementation. For example, the management device 400 may include device level emergency power systems configured to provide enough power for transferring the stranded data. These systems may include batteries or capacitors, among others.

Figure 5:
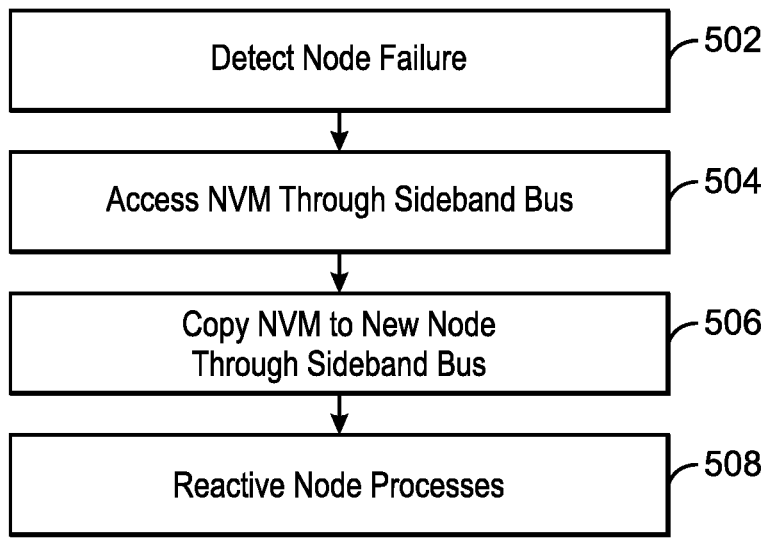
FIG. 5 is a process flow diagram illustrating a method for accessing stranded data in the NVM of a computing system.

FIG. 5 is a process flow diagram illustrating a method 500 for accessing stranded data in the NVM of a computing system. The method 500 begins at block 502 with the detection of a failure in a node. Among other techniques, in various examples, this may be performed by a power detection system noting the loss of main system power in a node or by a management system noting the loss of communications, such as a heartbeat signal, from a node. At block 504, a management bus, or sideband channel, is used to access data stranded in NVM in the failed node. At block 506, the data is copied to a failover node, for example, into a NVM or a virtual memory space. At block 508, node processes are reactivated using techniques described herein.

It is to be understood that the process flow diagram of FIG. 5 that any number of additional steps not shown in FIG. 5 may be included within the method 500, depending on the details of the specific implementation. For example, data lost from a RAID stripe, due to a failed DIMM in a node, may be recreated from data in stripes stored in other DIMMs.

The presently described technical examples may be susceptible to various modifications and alternative forms and have been shown only for illustrative purposes. For example, the present techniques support both reading and writing operations to a NVM in a node. Furthermore, it is to be understood that the present techniques are not intended to be limited to the particular technical examples disclosed herein. Indeed, the scope of the appended claims is deemed to include all alternatives, modifications, and equivalents that are apparent to persons skilled in the art to which the disclosed subject matter pertains.

What is claimed is:

1. A node for a computing system, the node comprising:
a memory module comprising:
a non-volatile memory;
a module memory controller that controls access to the non-volatile memory;
a main bus interface for connection to a main bus; and
a management device providing access to the non-volatile memory through a sideband management bus;
a main node processor connected to the module memory controller and having a main bus interface for connection to the main bus; and
a management processor having a sideband interface for connection to the sideband management bus, the management processor to detect a failure of the node and, in response thereto, to copy data from the non-volatile memory of the memory module to another node across the sideband management bus.

2. The node of claim 1 further comprising a second management device comprising the management processor, the second management device further comprising a power detect interface to detect loss of main system power, wherein the detection of the failure of the node by the management processor is based upon signals from the power detect interface.

3. The node of claim 1 further comprising a second management device comprising the management processor, the second management device further comprising a data access module to direct the management processor to accept data read from a second non-volatile memory module of a second module and received by the second management device over the sideband management bus.

4. The node of claim 1, wherein the management processor is to:
migrate a plurality of memory stripes from the non-volatile memory;
detect if any of the plurality of memory stripes comprise missing or defective data; and
rebuild the missing or defective data.

5. The node of claim 1, wherein the memory module comprises a dual in-line memory module.

6. The node of claim 1, wherein the memory module comprises a hybrid module further comprising a volatile memory.

7. The node of claim 1 further comprising a second management device comprising the management processor, the second management device further comprising:
a network interface connected to the management processor over an internal bus; and
a system management hub connected to the network interface, the system management hub being connectable to a management network to pass data through a management network to other devices.

8. The node of claim 1 further comprising a second management device comprising the management processor, the second management device further comprising:
a memory management interface coupled to the management processor over an internal bus; and
drivers coupled to the memory management interface for interfacing with the module memory controller.

9. The node of claim 1 further comprising a second management device comprising the management processor, the second management device further comprising:
a second non-volatile memory comprising:
a detection module for directing the management processor to detect the failure of the node; and
a data access module to direct the management processor to copy data from the first non-volatile memory or the second non-volatile memory to another node across the sideband management bus.

10. The node of claim 1 further comprising a second management device comprising the management processor, wherein the second management device is to feed power to the module memory controller and the non-volatile memory through the second management device in response to a total loss of node power.

11. The node of claim 1 further comprising a second memory module comprising:
a second non-volatile memory;
a second module memory controller having a main bus interface for connection to the main bus; and
a second management device providing access to the second non-volatile memory through the sideband management bus, wherein the management processor, upon detecting a failure of the node, is to copy data from the second non-volatile memory of the second memory module to another node across the sideband management bus.

12. A node for a computer system, the node comprising:
memory modules, each memory module comprising:
a non-volatile memory;
a module memory controller;
a main bus interface for connection to a main bus; and
a management device providing access to the non-volatile memory through a sideband management bus;
a main node processor connected to the module memory controller and having a main bus interface for connection to a main bus; and
a management processor having a sideband interface for connection to the sideband management bus, the management processor to accept data read from a second failed non-volatile memory module of a second module and received by the management device over the sideband management bus.

13. The node of claim 12, wherein the management processor is to access data stored in non-volatile memory of another node that has failed and to transfer the accessed data across a system management network to a target memory region of the node.

14. The node of claim 12, wherein the memory modules comprise dual in-line memory modules.

15. The node of claim 12, wherein each of the memory modules comprises a hybrid module further comprising a volatile memory.

16. A computer system comprising:
a first node comprising:
a first memory module comprising:
a first non-volatile memory;
a first module memory controller;
a first main bus interface for connection to a main bus; and
a first management device providing access to the first non-volatile memory through a first sideband management bus, the first management device being connected to a management network;

a first main node processor connected to the first module memory controller and having a first main bus interface connected to the main bus;
a second node comprising:
  a second memory module comprising:
    a second non-volatile memory; and
    a second module memory controller having:
      a second main bus interface connected to the main bus; and
      a second management device providing access to the second non-volatile memory through a second sideband management bus, the second management device being connected to the management network;
  a second main node processor connected to the second module memory controller and having a second main bus interface connected to the main bus; and
a management processor connected to the management network, the management processor to detect a failure of the first node and, in response thereto, to copy data from the first non-volatile memory of the first memory module to the second node across the first sideband management bus, the management network and the second sideband management bus.

17. The computer system of claim 16, wherein the management processor is connected to the main bus connecting the first main node processor and the second main node processor.

18. The computer system of claim 16, further comprising a third management device comprising the management processor, the third management device further comprising a power detect interface to detect loss of main system power for the first node, wherein the detection of the failure of the first node by the management processor is based upon signals from the power detect interface.

19. The computer system of claim 16, wherein the first node comprises a third memory module, and wherein the second node comprises a fourth memory module.

20. The computer system of claim 16, wherein the first memory module comprises a first hybrid memory module comprising a first volatile memory, and wherein the second memory module comprises a second hybrid module comprising a second volatile memory.

* * * * *